US007882862B2

(12) United States Patent
DeCapua et al.

(10) Patent No.: US 7,882,862 B2
(45) Date of Patent: Feb. 8, 2011

(54) FUEL AND VAPOR VENT MANAGEMENT SYSTEM FOR FILLER NECK

(75) Inventors: Dennis M. DeCapua, Greenfield, IN (US); Timothy J. King, Connersville, IN (US); Bradley L. Steusloff, Brookville, IN (US); J Bradley Groom, Oxford, OH (US); Chad A. McClung, Connersville, IN (US); Lowell R. Bell, Indianapolis, IN (US)

(73) Assignee: Stant USA Corp., Connersville, IN (US)

( * ) Notice: Subject to any disclaimer, the term of this patent is extended or adjusted under 35 U.S.C. 154(b) by 1153 days.

(21) Appl. No.: 11/427,766

(22) Filed: Jun. 29, 2006

(65) Prior Publication Data

US 2007/0000574 A1 Jan. 4, 2007

Related U.S. Application Data

(60) Provisional application No. 60/695,823, filed on Jun. 30, 2005, provisional application No. 60/743,154, filed on Jan. 20, 2006.

(51) Int. Cl.
*B65B 3/04* (2006.01)

(52) U.S. Cl. ......................... 141/295; 141/59; 141/206; 141/302; 141/350

(58) Field of Classification Search .................. 141/59, 141/192, 198, 206, 285, 286, 295, 301, 302, 141/348, 349, 350
See application file for complete search history.

(56) References Cited

U.S. PATENT DOCUMENTS 5,404,906 A * 4/1995 Aoshima et al. ............ 137/587
6,691,750 B1 * 2/2004 Foltz ......................... 141/350

* cited by examiner

*Primary Examiner*—Timothy L Maust
*Assistant Examiner*—Jason K Niesz
(74) *Attorney, Agent, or Firm*—Barnes & Thornburg LLP

(57) ABSTRACT

A filler neck closure assembly is provided for a fuel tank filler neck. The closure assembly is configured to receive a fuel-dispensing pump nozzle and to regulate discharge of liquid fuel and fuel vapor from a fuel tank filler neck to the surroundings.

18 Claims, 10 Drawing Sheets

FUEL AND VAPOR VENT MANAGEMENT SYSTEM FOR FILLER NECK

This application claims priority under 35 U.S.C. §119(e) to U.S. Provisional Application Ser. No. 60/695,823, filed Jun. 30, 2005 and U.S. Provisional Application Ser. No. 60/743,154, filed Jan. 20, 2006, which is expressly incorporated by reference herein.

BACKGROUND

The present disclosure relates to a filler neck closure system for a fuel tank, and particularly to a filler neck closure for use in a vehicle fuel tank filler neck. More particularly, the present disclosure relates to closure seals and vent valves for use in a filler neck closure assembly.

A fuel-dispensing pump nozzle provided at a filling station is operated to dispense liquid fuel into a vehicle fuel tank filler neck during a tank-refueling activity. Pump nozzles are known to include a fill-limiting sensor and a shut-off mechanism coupled to the sensor and configured to shut off the flow of fuel from the nozzle into a fuel tank filler neck whenever the tank is full and liquid fuel "backs up" the filler neck to splash onto or reach the fill-limiting sensor located on the nozzle.

Ordinarily, fuel vapor vent valves associated with the fuel tank close automatically once the tank is filled to capacity. Fuel vapor pressure increases in the tank once the fuel vapor vent valves close as long as fuel is still being pumped into the tank through the filler neck. This increased "tank" pressure displaces liquid fuel in the tank causing some liquid fuel to move upwardly in the filler neck in a direction toward the fuel-dispensing pump nozzle that is arranged to extend into the mouth of the filler neck. The upwardly moving liquid fuel reaches the nozzle and actuates a shut-off mechanism or sensor associated with the pump nozzle.

SUMMARY

According to the present disclosure, a filler neck closure assembly includes a nozzle-receiving housing associated with a vehicle fuel tank filler neck. The assembly includes a nozzle seal adapted to surround and mate with a fuel-dispensing pump nozzle inserted into the nozzle-receiving housing to establish a sealed connection therebetween. The assembly also includes a vent valve configured to vent excess liquid fuel and pressurized fuel vapor extant in the filler neck to the surrounding or to a selected external destination through the nozzle-receiving housing.

In illustrative embodiments, a monolithic annular fuel vapor controller made of an elastomeric material is configured to provide the nozzle seal and the vent valve. Also in illustrative embodiments, the fuel vapor controller is included in a capless fuel tank filler neck.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 5 is an enlarged sectional view taken along line 5-5 of FIG. 2 showing a pivotable outer appearance door and a pivotable inner flapper door in their sealed, closed positions and a stationary nozzle-guide funnel located in an upper fluid distribution channel formed in a nozzle-receiving housing of a filler neck closure assembly between the inner and outer doors to divide that upper fluid distribution channel into a liquid fuel overflow basin inside the nozzle-guide funnel and an outer liquid transfer chamber outside the nozzle-guide funnel and showing formation of the nozzle-guide funnel to include a side inlet aperture providing a passageway connecting the outer liquid transfer chamber to the overflow basin and showing a monolithic annular fuel vapor controller located between the inner flapper door and the stationary nozzle-guide funnel and mounted on a partition plate formed to include a vent aperture opening into the outer liquid transfer chamber;

FIG. 6 is a sectional view similar to FIG. 5 showing a pump nozzle moved into the filler neck through the overflow basin formed in the nozzle-guide funnel and a nozzle-receiving aperture formed in a radially inwardly extending annular nozzle seal included in the annular fuel vapor controller mounted on the partition plate to open both of the inner and outer doors and dispense liquid fuel from a fuel supply through the pump nozzle into the filler neck and showing a radially outwardly extending annular frustoconical wall seal also included in the annular fuel vapor controller in a normal closed position engaging a bottom wall of the upper fluid distribution channel to block flow of fuel and vapor between the filler neck and the outer liquid transfer chamber;

FIG. 7 is a sectional view similar to FIGS. 5 and 6 showing a "liquid fuel overflow" condition in the filler neck and filler neck closure assembly after an inadvertent failure of the fuel-dispensing pump nozzle to "shut off" automatically once the fuel tank and filler neck had been filled to capacity and showing upward flow of liquid fuel in the filler neck into the nozzle-receiving housing of the filler neck closure assembly to move the radially outwardly extending frustoconical wall seal away from the bottom wall of the upper fluid distribution channel to an "opened" position to allow flow of overflowing liquid fuel from the filler neck through the outer liquid transfer chamber and into the overflow basin formed in the funnel so that the liquid fuel that has accumulated and risen in the overflow basin to reach the outermost nozzle-receiving opening pours slowly over a "weir" established by an outer lip configured to define that outermost nozzle-receiving opening in a downward direction onto, for example, the ground underlying a vehicle containing the fuel tank filler neck;

FIG. 8 is a perspective view of a "vent-control" subassembly comprising the partition plate and the monolithic annular fuel vapor controller mounted in a large central aperture formed in the partition plate and diagrammatically illustrating a portion of the "liquid fuel overflow" scene depicted in FIG. 7 and showing a portion of the fuel-dispensing pump nozzle extending through the nozzle-receiving aperture formed in the radially inwardly extending nozzle seal and showing liquid fuel flowing upwardly from the tip of the pump nozzle through the nine vent apertures formed in the partition plate;

FIG. 9 is an enlarged sectional view taken from FIG. 7 showing liquid fuel flowing upwardly past the "opened" radially outwardly extending annular frustoconical wall seal located under the partition plate and first into the outer liquid fuel transfer chamber through one of the vent apertures formed in the partition plate and then into the overflow basin formed in the nozzle-guide funnel through the side inlet aperture formed in the nozzle-guide funnel;

FIG. 11 is an enlarged sectional view similar to FIG. 5 of a filler neck closure assembly in accordance with another embodiment of the present disclosure showing a pivotable outer appearance door and a pivotable inner flapper door in their sealed, closed positions in a nozzle-receiving housing of a filler neck closure assembly and showing a monolithic fuel vapor controller formed in accordance with a second embodiment of the present disclosure to include a frustoconical radially inwardly extending nozzle seal and a radially outwardly extending annular frustoconical wall seal arranged to surround the nozzle seal and configured to flex relative to the nozzle seal to open and close a vent aperture formed in the nozzle-receiving housing;

FIG. 12 is a sectional view similar to FIG. 11 showing a pump nozzle passing through a nozzle-receiving aperture defined by the nozzle seal (with the outer appearance door removed) and mating with the nozzle seal to establish a scaled connection therebetween while holding the inner flapper door in an opened position.

DETAILED DESCRIPTION

Figure 1:
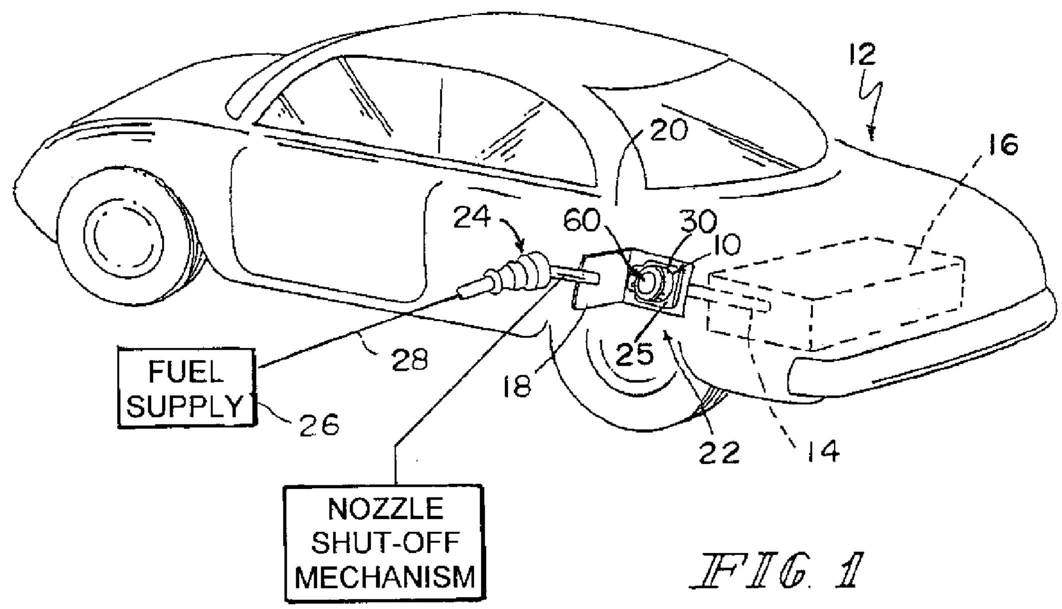
FIG. 1 is a perspective view showing an outer filler neck access door moved to an opened position relative to a vehicle body panel to expose an illustrative filler neck closure assembly coupled to a filler neck leading to a vehicle fuel tank and showing a fuel-dispensing pump nozzle coupled to a fuel supply and configured to be inserted into the filler neck closure assembly during vehicle refueling to discharge liquid fuel into the filler neck leading to the vehicle fuel tank.
Figure 2:
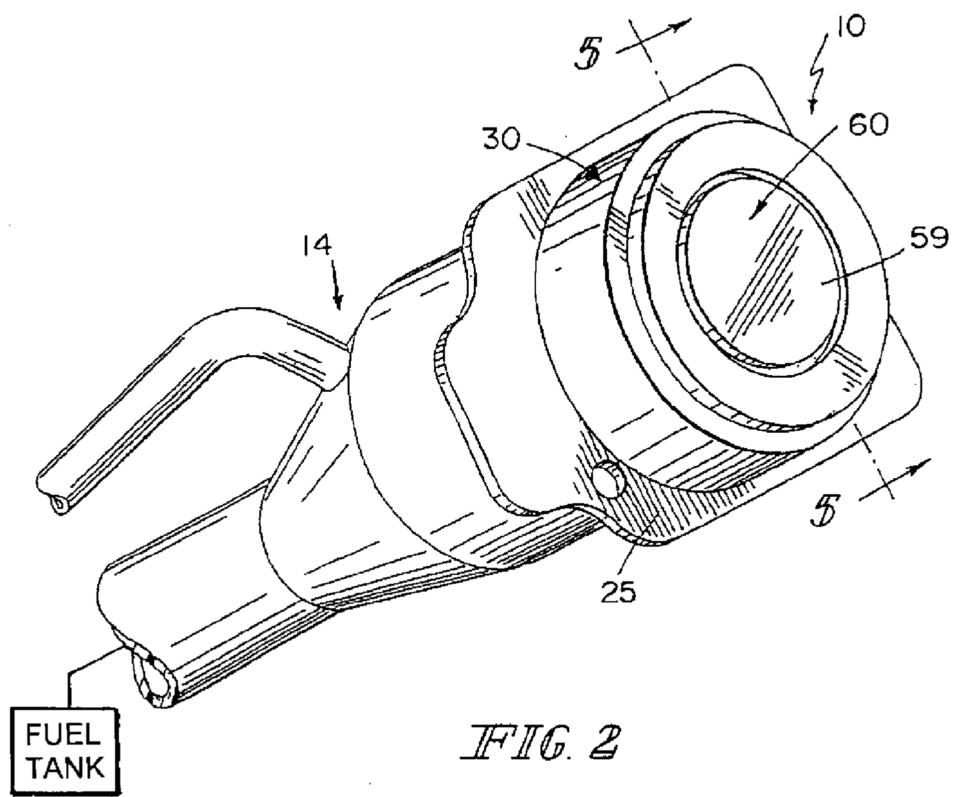
FIG. 2 is an enlarged perspective view of the filler neck closure assembly of FIG. 1 coupled to the filler neck and showing an outer shell formed to include an outer aperture and a pivotable appearance door closing the outer aperture.

As shown in FIGS. 1 and 2, a filler neck closure assembly 10 is provided in a vehicle 12 normally to close a filler neck 14 extending from a fuel tank 16 onboard vehicle 12. During refueling, an outer filler neck access door 18 is moved relative to a vehicle body panel 20 to expose filler neck closure assembly 10 as shown, for example, in FIG. 1. Filler neck closure assembly 10 is located in a chamber 22 formed in vehicle 12 so that assembly 10 is "out of sight" when access door 18 is closed. A bracket 25 is used to support filler neck closure assembly 10 in chamber 22 as suggested in FIGS. 1 and 2. A fuel-dispensing pump nozzle 24 having a nozzle shut-off mechanism 104 is coupled to a fuel supply 26 by a hose 28 and configured to be inserted into filler neck closure assembly 10 during vehicle refueling to discharge liquid fuel 29 into filler neck 14 as suggested in FIG. 6. Under normal circumstances, nozzle shut-off mechanism 104 operates automatically to shut off flow of liquid fuel 29 from pump nozzle 24 into filler neck 14 when fuel tank 16 has been filled to capacity.

Figure 3:
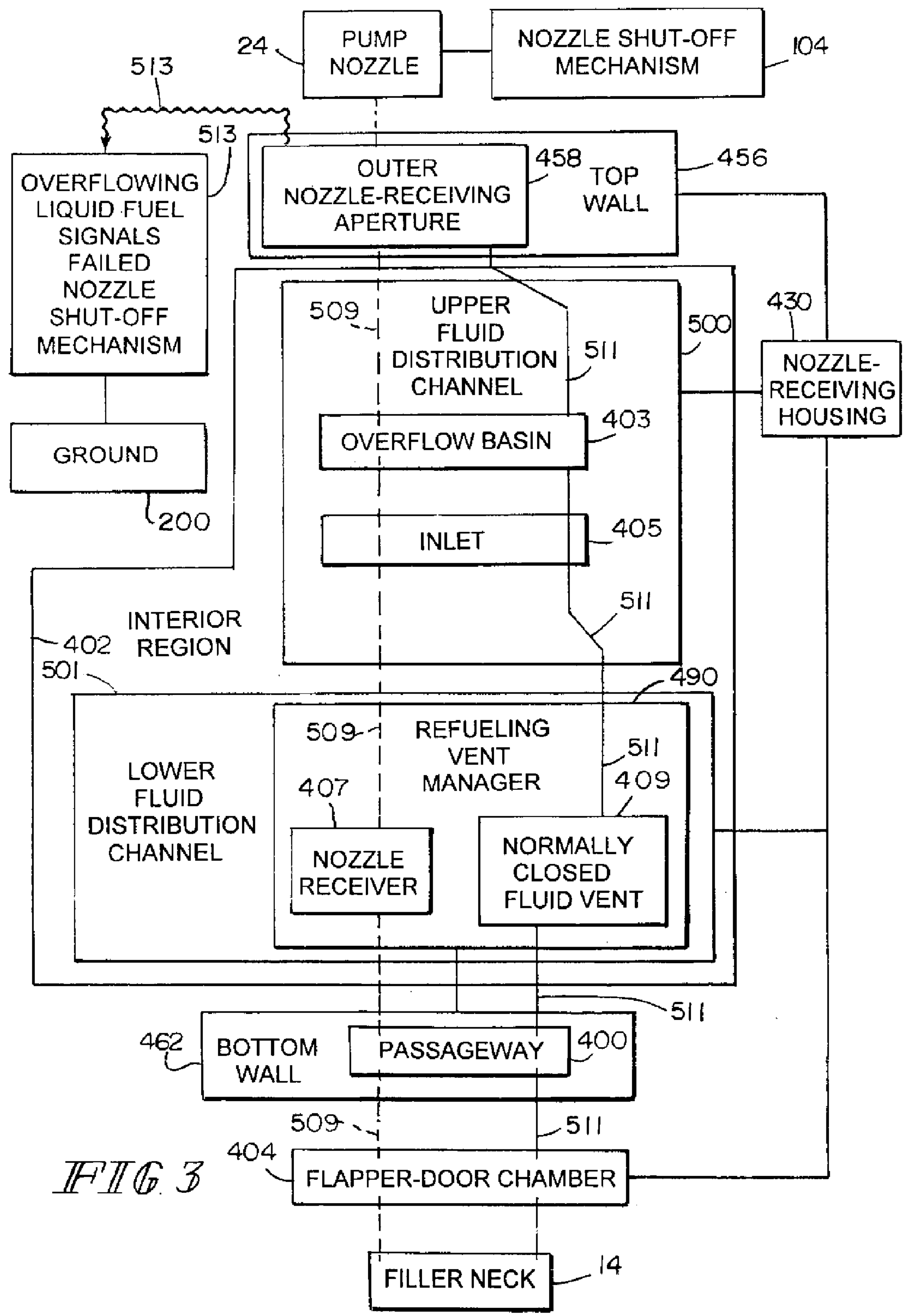
FIG. 3 is a diagrammatic illustration of a fuel vapor vent management system in accordance with the present disclosure.

An illustrative fuel vapor vent management system in accordance with the present disclosure is diagrammed in FIG. 3. One illustrative embodiment of this system is diagrammed generally in FIG. 4 and illustrated specifically in FIGS. 5-9. Another illustrative embodiment of this system is diagrammed generally in FIG. 10 and illustrated specifically in FIGS. 11-13.

As suggested in FIG. 3, a nozzle-receiving housing 430 includes a top wall 456 formed to include an outer nozzle-receiving aperture 458, a bottom wall 462 formed to include a passageway 400, an interior region 402 located between top and bottom walls 462, and a flapper-door chamber 404 under bottom wall 462. Interior region 402 is formed to include an upper fluid distribution channel 500 communicating with outer nozzle-receiving aperture 458 and an underlying lower fluid distribution channel 501 communicating with passageway 40 and upper fluid distribution channel 500. Illustratively, upper fluid distribution channel 500 includes an overflow basin 403 communicating with outer nozzle-receiving aperture 458 and an inlet 405 interposed between overflow basin 403 and lower fluid distribution channel 501.

As also suggested in FIG. 3, a refueling vent manager 490 including a nozzle receiver 407 and a normally closed fluid vent 409 is located in lower fluid distribution channel 501. In an illustrative embodiment, during fuel tank refueling, a fuel-dispensing pump nozzle 24 is passed along phantom line 509 by an operator through outer nozzle-receiving aperture 458, overflow basin 403 and inlet 405 of upper fluid distribution channel 500, nozzle receiver 407 of refueling vent manager 490 in lower fluid distribution channel 501, passageway 400 in bottom wall 462, and flapper-door chamber 404 into filler neck 14. Using pump nozzle 24, liquid fuel is dispensed into filler neck 16 for delivery to a fuel tank coupled to filler neck 14. Fluid vent 409 in refueling vent manager 490 is closed normally during tank refueling of this sort.

In the event a nozzle shut-off mechanism 104 associated with pump nozzle 24 fails inadvertently to shut off flow of liquid fuel from pump nozzle 24 when the fuel tank is "full," then liquid fuel will flow upwardly from the fuel tank along line 511 through filler neck 14, flapper-door chamber 404, passageway 400 of bottom wall 462 and into lower fluid distribution channel 501. In an illustrative embodiment, the rising level of liquid fuel in lower fluid distribution channel 501 will exert a force sufficient to move fluid vent 409 from a normally closed position to an opened position. This "opening" of fluid vent 409 allows liquid fuel to continue to flow upwardly along line 511 through inlet 405 and overflow basin 403 in upper fluid distribution channel 500. Then, the liquid fuel will overflow out of nozzle-receiving housing 430 through outer nozzle-receiving aperture 458 as a liquid stream 513 to signal the operator that nozzle shut-off mechanism 104 has failed. Liquid stream 513 will fall downwardly onto underlying ground 200 and the operator will know to turn off pump nozzle 24 manually.

Figure 4:
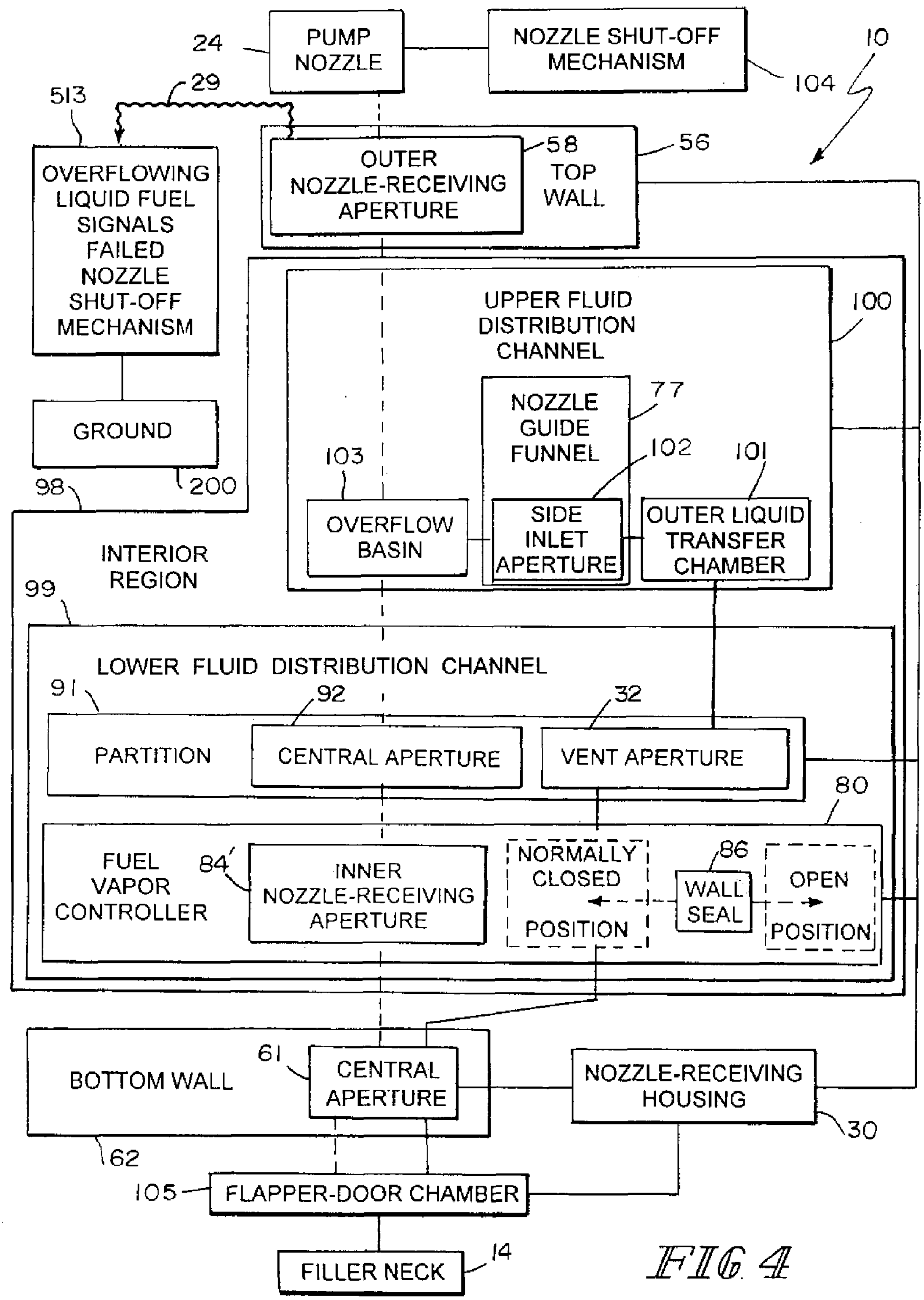
FIG. 4 is a diagrammatic illustration of a fuel vapor vent management system in accordance with a first embodiment of the present disclosure.

In the embodiment shown diagrammatically in FIG. 4 and illustratively in FIGS. 5-9, a refueling vent manager 90 comprises a partition plate 91 having a central aperture 92 and one or more vent apertures 32 and a fuel vapor controller 80 including an inner nozzle-receiving aperture 84' and a normally closed wall seal 86. In this embodiment, partition plate 91 and an outer liquid transfer chamber 101 are provided.

Figure 5:
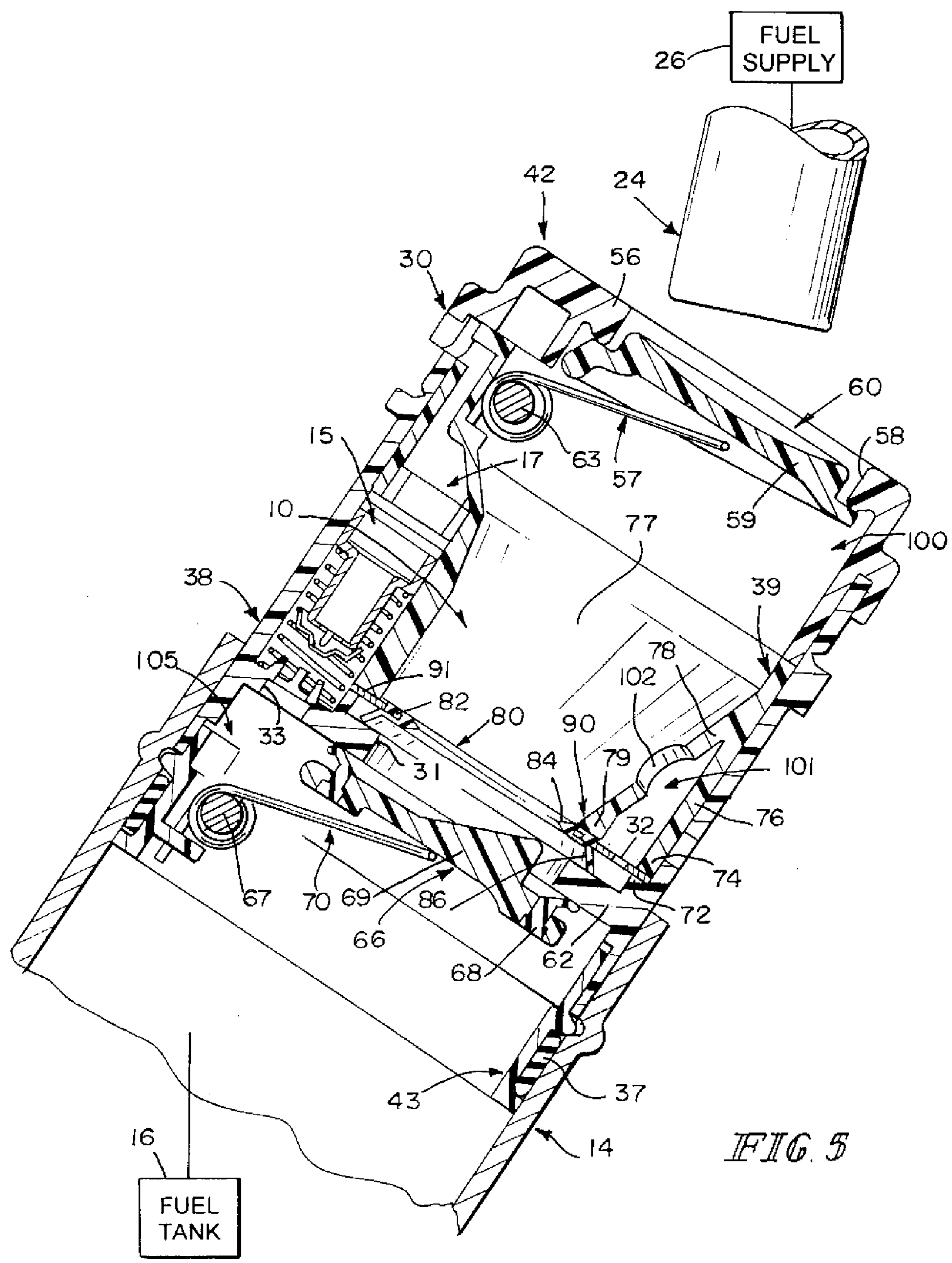
FIGS. 5-9 show an illustrative fuel and vapor vent management system included in a filler neck closure assembly in accordance with the first embodiment of the present disclosure, which system operates to vent excess liquid fuel that has accumulated in a fuel tank filler neck to the surroundings outside the filler neck after a fuel-dispensing pump nozzle inserted into the filler neck has failed to shut off properly at the end of a fuel tank refueling activity.

As suggested in FIGS. 4 and 5, filler neck closure assembly 10 includes a nozzle-receiving housing 30 adapted to be coupled to a mouth of filler neck 14. A sealing gasket 37 is interposed between housing 30 and filler neck 14 to establish a sealed connection therebetween. As shown in FIG. 5, housing 30 comprises a base 38, an insert 39 arranged to extend into base 38, an outer shell 42 coupled to base 38, and a retainer 43 located in filler neck 14 and coupled to base 38 to retain sealing gasket 37 in an annular space formed between retainer 43 and filler neck 14.

Nozzle-receiving housing 30 also includes a bottom wall 62 provided, for example, on base 38 and formed to include a first opening 31 sized to receive pump nozzle 24 therein. Bottom wall 62 is also formed to include a second opening 33 leading to a vacuum-relief valve assembly 15 located in a space 17 formed between base 38 and insert 39 as shown in FIG. 5. Vacuum-relief valve assembly 15 operates to admit air from the surroundings into filler neck 14 whenever a predetermined subatmospheric pressure develops in filler neck 14.

Figure 6:
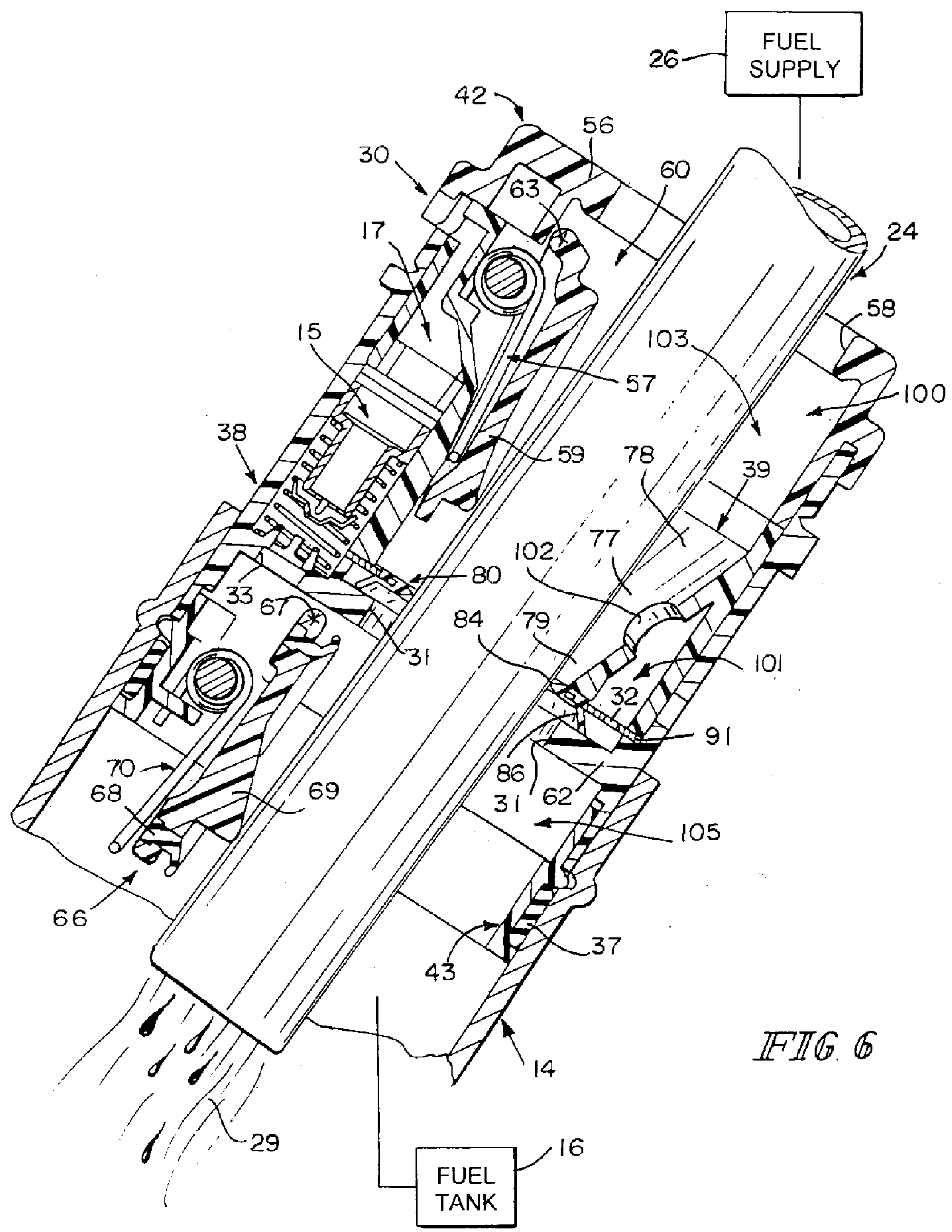

As suggested in FIG. 5, housing 30 includes a top wall 56 provided, for example, on outer shell 42 in spaced-apart relation to bottom wall 62. Top wall 56 is formed to include an outer nozzle-receiving aperture 58 normally closed by outer closure 60. Outer closure 60 can be moved (e.g., pivoted) by pump nozzle 24 to assume an opened position during refueling as shown in FIG. 6. Inner opening 31 formed in bottom wall 62 is closed normally by flapper door 66 located in a flapper-door chamber 105 located under bottom wall 62. Flapper door 66 can be moved (e.g., pivoted) by pump nozzle 24 from the closed position shown in FIG. 5 to assume an opened position during refueling as suggested in FIG. 6.

As suggested in FIGS. 2 and 5, outer closure 60 includes an appearance door 59 mounted for pivotable movement on pivot 63 relative to base 38 and configured to carry, for example, an annular seal member (not shown). When outer closure 60 is moved to assume the closed position by spring 57, appearance door occludes outer nozzle-receiving opening 58 and any seal member carried on appearance door 59 establishes a sealed connection between top wall 56 of outer shell 42 and appearance door 59.

As also suggested in FIG. 5, flapper door 66 is arranged to move about pivot 67 between a closed position shown in FIG. 5 and an opened position shown in FIG. 6. Flapper door 66 includes a seal 68 carried on a pivotable seal support 69. Seal 68 is adapted to mate with an underside of bottom wall 62 of base 38 and close first opening 31 upon movement of flapper door 66 to the closed position as shown, for example, in FIG. 5. A spring 70 is provided to urge flapper door 66 normally and yieldably to the closed position.

Figure 8:
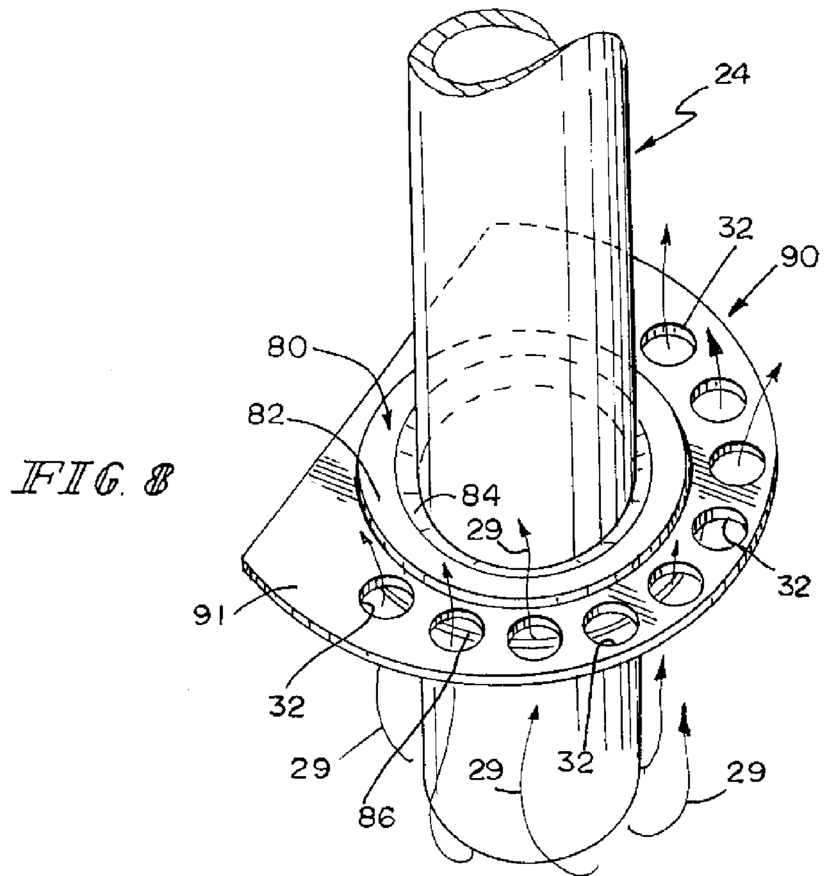
Figure 9:
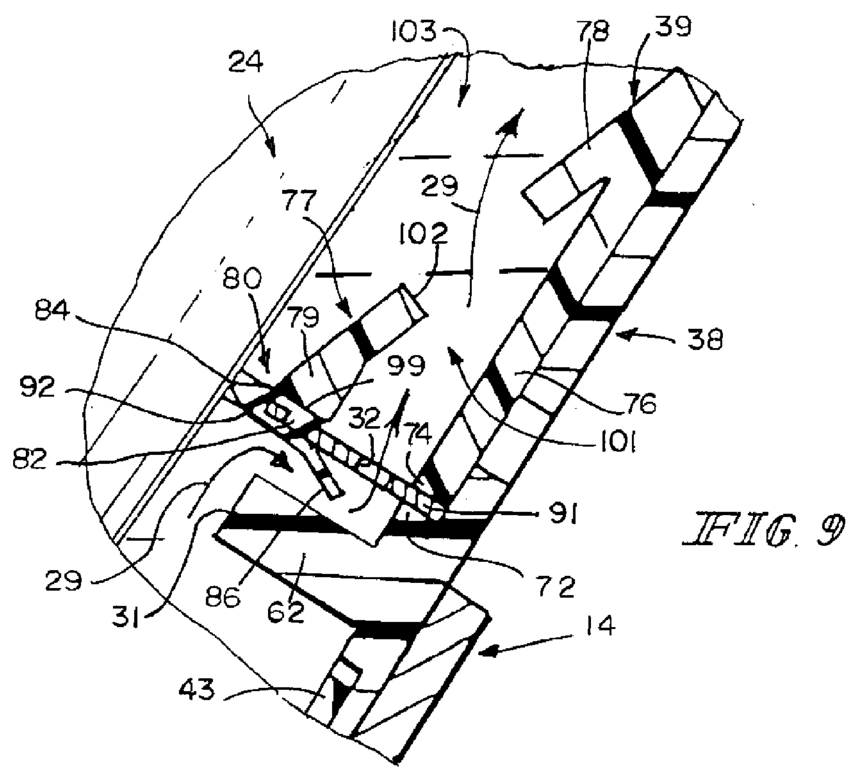

A vent-control subassembly (i.e., refueling vent manager) 90 included in filler neck closure assembly 10 is suggested in FIG. 4 and shown, for example, in FIGS. 5, 8, and 9. Vent-control subassembly 90 comprises a partition plate 91 and a monolithic annular fuel vapor controller 80 including a mount portion mounted in a large central aperture 92 formed in partition plate 91 as suggested in FIG. 9. Partition plate 91 is also formed to include a set of, for example, nine vent apertures 32 as suggested in FIG. 8

Partition plate 91 is a thin metal sheet in the illustrated embodiment. Partition plate 91 is trapped in a stationary position in filler neck closure assembly 10 between an upwardly facing flange 72 on base 38 and a downwardly facing edge 74 on an annular side wall 76 included in insert 39 as shown, for example, in FIGS. 5 and 9. Partition plate 91 is located in a lower fluid distribution channel 99 provided in an interior region 98 formed between bottom and top walls 62, 56 in the illustrated embodiment. Partition plate 91 is formed to include a central aperture 92 and one or more vent apertures 32.

Insert 39 is a molded part made of a plastics material in the illustrated embodiment. Insert 39 includes a nozzle-guide funnel 77 having a frustoconical shape and a wide-diameter upper portion 78 coupled to an upper portion of annular side wall 76 as suggested in FIG. 5. Insert 39 also includes a relatively narrower narrow-diameter inner portion 79 arranged to mate with an upwardly facing surface 99 provided on vent-control subassembly 90 as suggested in FIG. 9 and specifically on annular fuel vapor controller 80 as shown, for example, in FIGS. 5 and 9.

Stationary nozzle-guide funnel 77 is located in a upper fluid distribution channel 100 formed in filler neck closure assembly 10 between bottom wall 62 and top wall 56 of nozzle-receiving housing 30 as shown in FIG. 5. Nozzle-guide funnel 77 is arranged to divide upper fluid distribution channel 100 into an overflow basin 103 provided inside nozzle-guide funnel 77 and an outer liquid transfer chamber 101 provided outside nozzle-guide funnel 77 and between nozzle-guide funnel 77 and the surrounding annular side wall 76 as shown, for example, in FIGS. 5 and 9. Nozzle-guide funnel 77 is also formed to include a side inlet aperture 102 providing a passageway connecting outer liquid transfer chamber 101 to overflow basin 103 in fluid communication to allow liquid fuel 29 in outer liquid transfer chamber 101 to flow through side inlet aperture 102 into overflow basin 103 during, for example, failure of a nozzle shut-off mechanism 104 associated with fuel-dispensing pump nozzle 24 as suggested in FIG. 9.

A monolithic annular fuel vapor controller 80 in accordance with a first embodiment of the present disclosure is shown in FIGS. 5-9. Fuel vapor controller 80 is shown best in FIG. 9 and is formed to include an annular mount portion 82 coupled to partition plate 91. Fuel vapor controller 80 also includes a radially inwardly extending nozzle seal 84 arranged to extend radially inwardly from annular mount portion 82 into first opening 31 to mate with pump nozzle 24 during tank refueling activities as suggested in FIGS. 6-9. Fuel vapor controller 80 also includes a radially outwardly extending frustoconical annular wall seal 86 arranged to extend radially outwardly from annular mount portion 82 normally to engage bottom wall 62 of housing base 38 to block flow of fuel and vapor between filler neck 14 and outer liquid transfer chamber 101 as shown, for example, in FIG. 5.

Fuel vapor controller 80 is made of an elastomeric material to establish a sealed connection with other structures contacted by component 80. It is within the scope of this disclosure to use polymeric and elastomeric materials that are electrically conductive to discharge static electricity from nozzle 24 to filler neck 14 in the condition shown, for example, in FIG. 6.

Figure 7:
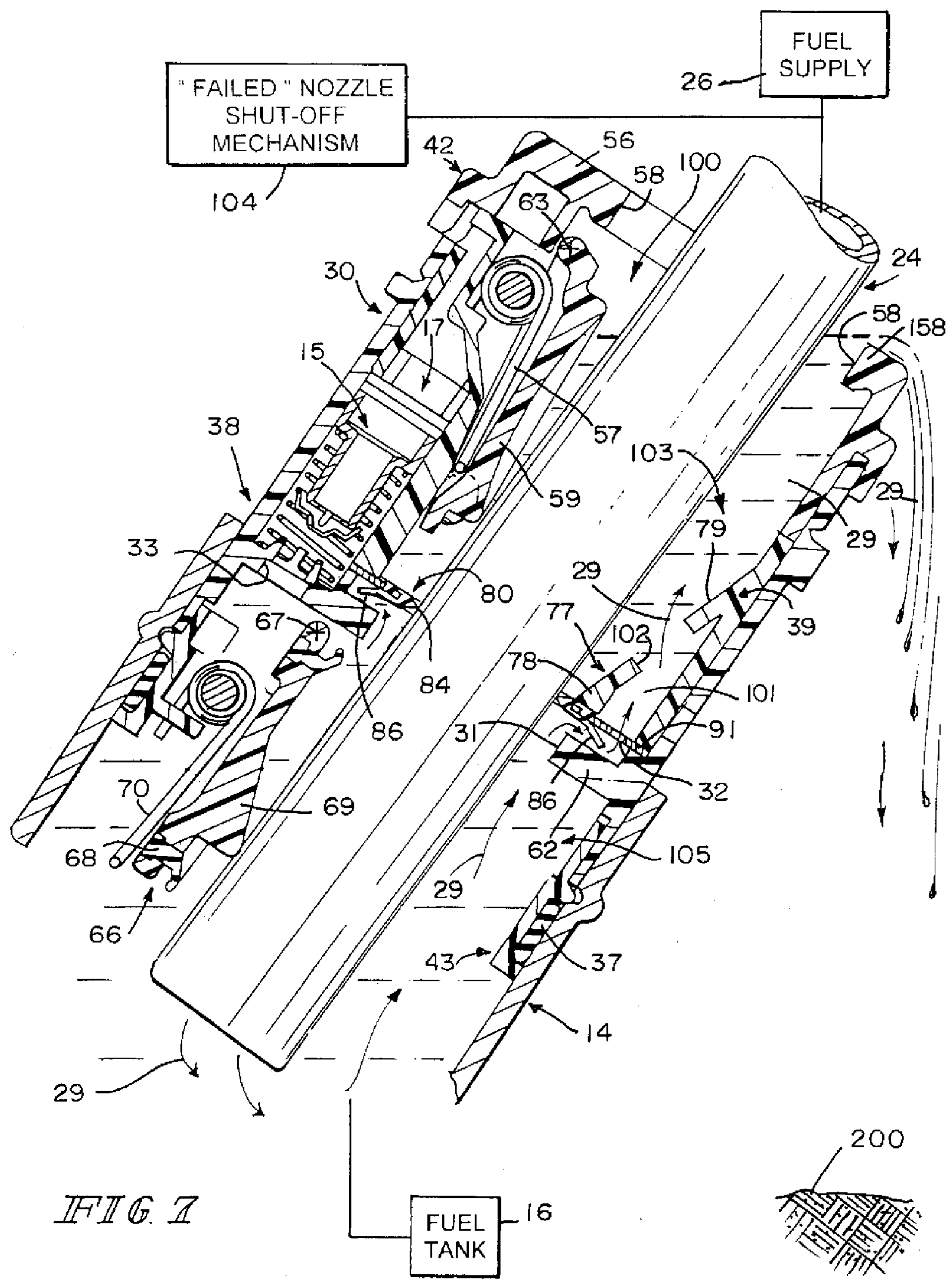

As suggested in FIGS. 5-7, nozzle seal 84 is formed to include an inner nozzle-receiving aperture 84' and is arranged to contact and mate with an exterior portion of fuel-dispensing pump nozzle 24 as nozzle 24 is moved into nozzle-receiving housing 30 after opening appearance door 59 and before opening flapper door 66. A sealed connection (e.g., hermetic seal) is established between nozzle 24 and nozzle seal 84 as suggested in FIGS. 6 and 7. Hydrocarbon (fuel) vapor and liquid fuel extant in filler neck 14 is blocked from escaping from filler neck 14 into nozzle-receiving housing 30 (and its surroundings) in a space defined between nozzle 24 and an edge of bottom wall 62 bordering first opening 31 owing to the sealed connection established between nozzle 24 and nozzle seal 84 during fuel tank refueling. Such a seal reduces the amount of entrained air during refueling by recirculating the trapped air and fuel vapor inside the fuel system.

As suggested in FIGS. 4 and 5, wall seal 86 is flexed normally to engage an upwardly facing surface of bottom wall 62. However, if the pressure level of fuel vapor extant in filler neck 14 rises above a predetermined level and is communicated to wall seal 86 and/or if liquid fuel 29 fills filler neck 14 and flows upwardly, as shown in FIG. 7, to reach wall seal 86 (during, for example, a failed nozzle shut-off situation), then the pressurized fuel vapor or liquid fuel will apply an upward force sufficient to deform wall seal 86 and move wall seal 86 away from sealing engagement with a top side of bottom wall 62 of base 38. Thus, high-pressure fuel vapor and/or liquid fuel 29 can vent from filler neck 14 into nozzle-receiving housing 30 (and its surroundings) through opening (s) 32 formed in partition plate 91 to relieve excess pressure and liquid in filler neck 14. At the same time, the "raised" annular wall seal 86 is arranged to block liquid fuel carried with high-pressure fuel vapor from being expelled from filler neck 14 through outer nozzle-receiving opening 58.

Monolithic fuel vapor controller 80 acts to reduce the amount of hydrocarbon vapor generated during vehicle refueling while acting to relieve tank pressure and to direct expelled liquid fuel in the event that the fuel system is overpressurized. This could happen if fuel-dispensing pump nozzle 24 fails to shut off at the proper time during vehicle refueling.

Filler neck closure assembly 10 functions to manage "overflow" of liquid fuel 29 during an inadvertent failure of nozzle shut-off mechanism 104 as suggested in FIGS. 7-9. During such an event, liquid fuel 29 rises in filler neck 14 and flows upwardly into nozzle-receiving housing 30 through first opening 31 formed in bottom wall 62. The rising liquid fuel 29 reaches wall seal 86 and pushes upwardly against a downwardly facing surface of wall seal 86 to flex and move wall seal 86 to the opened position shown in FIGS. 7-9. By opening wall seal 86, the rising liquid fuel 29 is able to flow first through second opening(s) 32 formed in partition plate 91 into outer liquid transfer chamber 101 and then through side inlet aperture 102 into the overflow basin 103 formed in nozzle-guide funnel 77. As the level of liquid fuel 29 continues to rise, liquid fuel 29 will accumulate in overflow basin 103 as shown in FIG. 7. Finally, once overflow basin 103 is "filled", any liquid fuel 29 reaching an outer lip 158 defining the outermost nozzle-receiving opening 58 will pour slowly over a "weir" established by outer lip 158 in a downward direction onto, for example, the ground 200 underlying a vehicle 12 containing fuel tank filler neck 14. This result will provide a visual signal causing the person controlling pump nozzle 24 to shut the nozzle 24 off manually.

Figure 10:
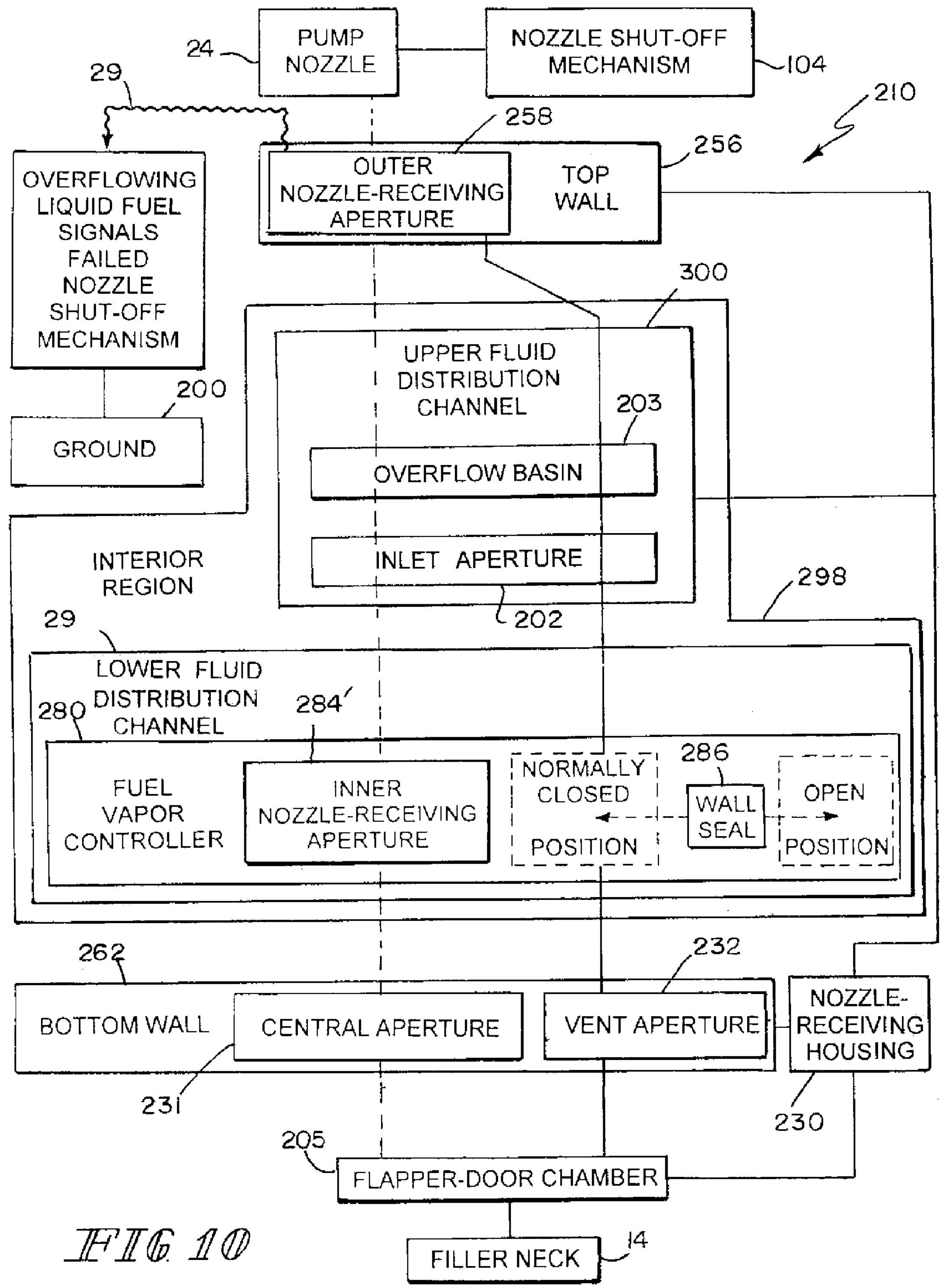
FIG. 10 is a diagrammatic illustration of a fuel vapor vent management system in accordance with a second embodiment of the present disclosure.
Figure 11:
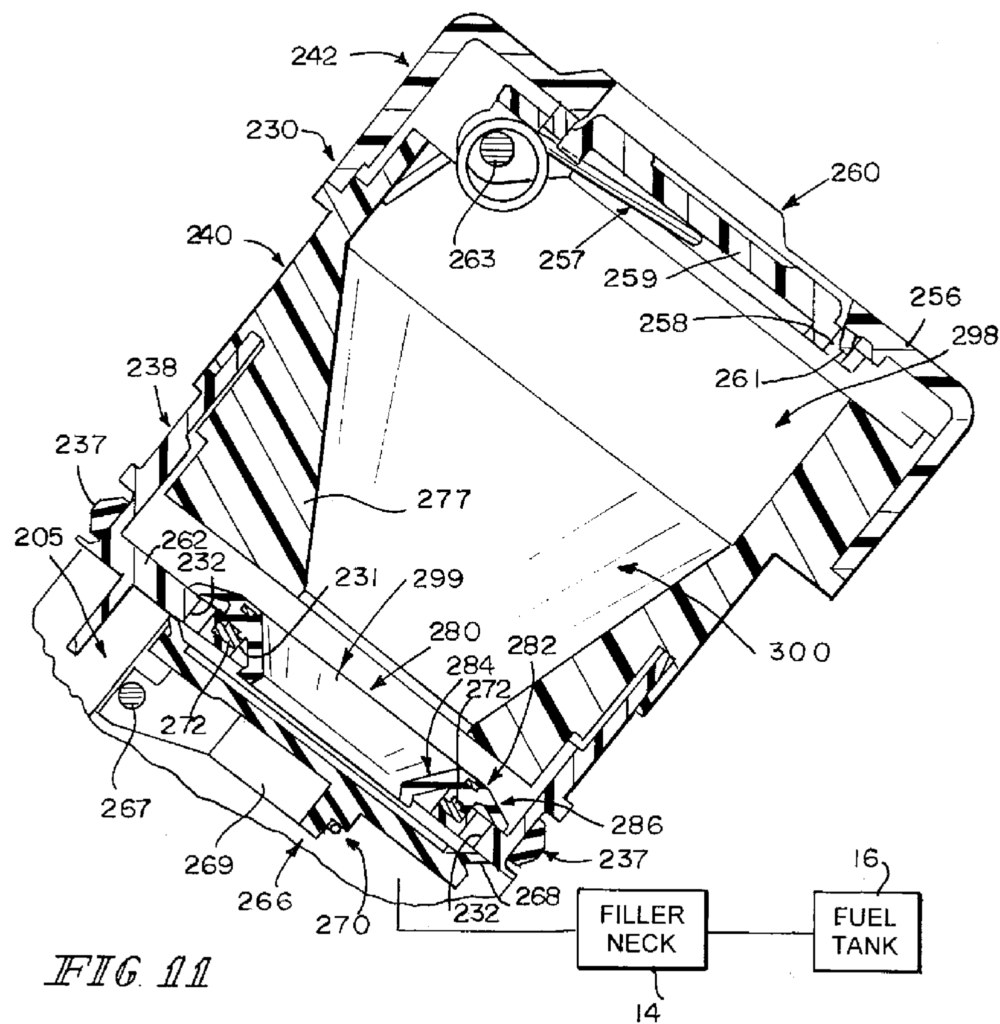
FIGS. 11 and 12 show an illustrative fuel and vapor vent management system included in a filler neck closure assembly in accordance with the second embodiment of the present disclosure, which system operates to vent excess liquid fuel that has accumulated in a fuel tank filler neck to the surroundings outside the filler neck after a fuel-dispensing pump nozzle inserted into the filler neck has failed to shut off properly at the end of a fuel tank refueling activity.
Figure 12:
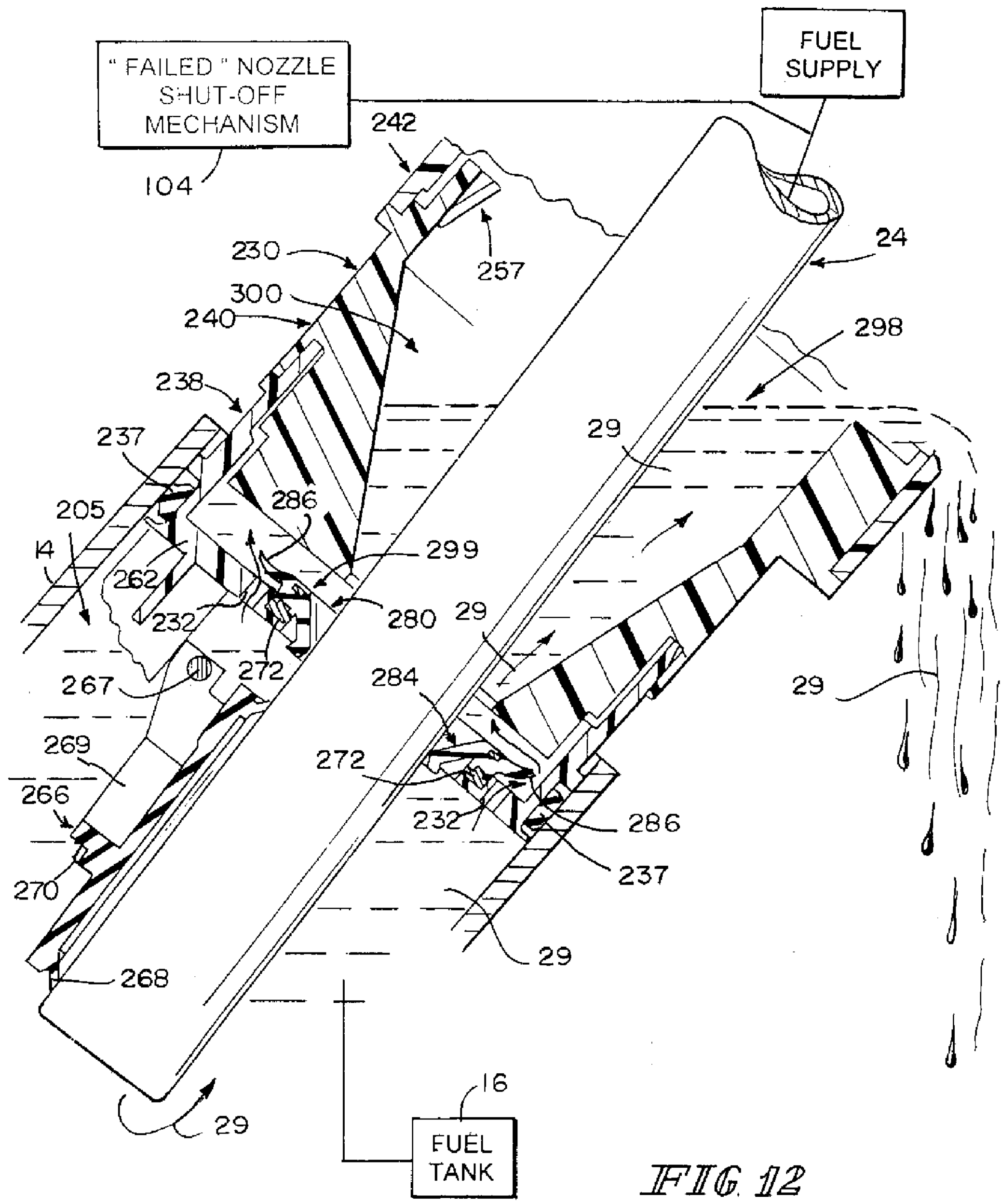

As suggested diagrammatically in FIG. 10 and illustratively in FIGS. 11 and 12, filler neck closure assembly 210 in accordance with another embodiment of the present disclosure includes a nozzle-receiving housing 230 adapted to be coupled to a mouth of filler neck 14. A sealing gasket 237 is interposed between housing 230 and filler neck 14 to establish a sealed connection therebetween. In the illustrated embodiment, housing 230 comprises a base 238, an outer body 240 coupled to base 238, and an outer shell 242 coupled to outer body 240 as shown in FIG. 11. Housing 230 also includes a bottom wall 262 provided, for example, on base 238 and formed to include a first opening 231 sized to receive pump nozzle 24 therethrough (as shown in FIG. 12) and one or more second openings 232 for venting liquid fuel overflow therethrough from filler neck 14 into housing 230 as shown, for example, in FIG. 12.

As suggested in FIG. 11, a nozzle-guide funnel 277 is located in an upper fluid distribution channel 300 provided in interior region 298 of housing 230. Nozzle-guide funnel 277 formed to include overflow basin 203 and inlet aperture 202 as suggested in FIGS. 10 and 11. A lower fluid distribution channel 299 is located between upper fluid distribution channel 300 and bottom wall 262 as suggested diagrammatically in FIG. 10 and illustratively in FIG. 11.

As suggested in FIG. 12, housing 230 is adapted to be coupled to fuel tank filler neck 14 to receive fuel-dispensing pump nozzle 24 during refueling of fuel tank 16. As suggested in FIG. 11, housing 230 includes a top wall 256 provided, for example, on outer shell 242 and formed to include an outer nozzle-receiving aperture 258 normally closed by outer closure 260. Outer closure 260 can be moved (e.g., pivoted) by pump nozzle 24 to assume an opened position during refueling. Housing 230 also includes a bottom wall 262 provided, for example, on base 238 and formed to include an inner opening 231 normally closed by flapper door 266 located in a flapper-door chamber 205 provided under bottom wall 262. Flapper door 266 can be moved (e.g., pivoted) by pump nozzle 24 from the closed position shown in FIG. 8 to assume an opened position during refueling as suggested in FIG. 12.

As suggested in FIG. 11, outer closure 260 includes an appearance door 259 mounted for pivotable movement on pivot 263 relative to outer body 240 and configured to carry an annular seal member 261. When outer closure 260 is moved to assume the closed position by spring 257, appearance door 259 occludes outer nozzle-receiving opening 258 and seal member 261 establishes a sealed connection between top wall 256 of outer shell 242 and appearance door 259.

As also suggested in FIG. 11, flapper door 266 is arranged to move about pivot 267 between a closed position shown in FIG. 11 and an opened position shown in FIG. 12. Flapper door 266 includes a seal 268 carried on a pivotable seal support 269. Seal 268 is adapted to mate with an underside of bottom wall 262 of base 238 and close first and second openings 231, 232 upon movement of flapper door 266 to the closed position as shown, for example, in FIG. 11. A spring 270 is provided to urge flapper door 266 normally and yieldably to the closed position.

A monolithic annular fuel vapor controller 280 in accordance with a second embodiment of the present disclosure is shown in FIGS. 11 and 12. Fuel vapor controller 280 is formed to include an annular mount portion 282 coupled to bottom wall 262 of base 238 by a retainer 272. Fuel vapor controller 280 also includes a frustoconical nozzle seal 284 formed to include an inner nozzle-receiving aperture 284 arranged to extend radially inwardly from annular mount portion 282 into first opening 31 and a frustoconical wall seal 286 arranged to extend radially outwardly from annular mount portion 282 normally to close second opening(s) 232 formed in bottom wall 262 of housing base 238.

Fuel vapor controller 280 is made of an elastomeric material to establish a sealed connection with other structures contacted by fuel vapor controller 280. It is within the scope of this disclosure to use polymeric and elastomeric materials that are electrically conductive to discharge static electricity from nozzle 24 to filler neck 14 in the condition shown, for example, in FIG. 12.

As suggested in FIGS. 11 and 12, nozzle seal 284 is arranged to contact and mate with an exterior portion of fuel-dispensing pump nozzle 24 as nozzle 24 is moved into nozzle-receiving housing 230 after opening appearance door 259 and before opening flapper door 266. A sealed connection (e.g., hermetic seal) is established between nozzle 24 and nozzle seal 284 as suggested in FIG. 12. Hydrocarbon (fuel) vapor and liquid fuel extant in filler neck 14 is blocked from escaping from filler neck 14 into nozzle-receiving housing 230 (and its surroundings) in a space defined between nozzle 24 and an edge of bottom wall 262 bordering first opening 231 owing to the sealed connection established between nozzle 24 and nozzle seal 284 during fuel tank refueling. Such a seal reduces the amount of entrained air during refueling by recirculating the trapped air and fuel vapor inside the fuel system.

As suggested diagrammatically in FIG. 10 and illustratively in FIG. 11, platform seal 286 is flexed normally to close second opening(s) 232. However, if the pressure level of fuel vapor extant in filler neck 14 rises above a predetermined level and is communicated to second opening(s) 232 and if liquid fuel fills filler neck 14 and flows upwardly through vent aperture 232 as shown in FIG. 12 (during, for example, failed nozzle shut-off), then the pressurized fuel vapor or liquid fuel will apply an upward force sufficient to deform wall seal 286 and move wall seal 286 away from sealing engagement with a top side of bottom wall 262 of base 238. Thus, high-pressure fuel vapor and/or liquid fuel can vent from filler neck 14 into nozzle-receiving housing 230 (and its surroundings) through opening(s) 232 to relieve excess pressure and liquid in filler neck 14. At the same time, the raised annular platform seal 286 is arranged to block liquid fuel carried with high-pressure fuel vapor from being expelled from filler neck 14 through outer nozzle-receiving opening 258.

Monolithic fuel vapor controller 280 acts to reduce the amount of hydrocarbon vapor generated during vehicle refueling while acting to relieve tank pressure and to direct expelled liquid fuel in the event that the fuel system is overpressurized. This could happen if fuel-dispensing pump nozzle 24 fails to shut off at the proper time during vehicle refueling.

Figure 13:
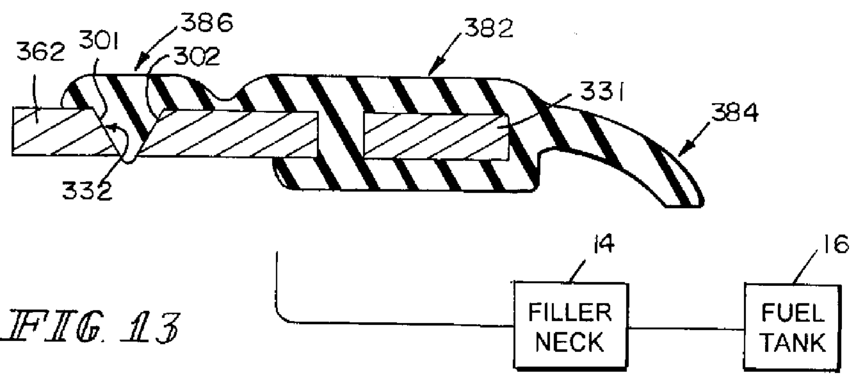
FIG. 13 is an enlarged sectional view of a portion of a variation of the monolithic fuel vapor controller (as compared to the monolithic fuel vapor controller shown in FIGS. 11 and 12) formed in accordance with the second embodiment of the present disclosure to include a curved annular nozzle seal, a mechanical bond between the nozzle seal and a seal-support wall included in a nozzle-receiving housing, and a self-centering vent valve.

A monolithic fuel vapor controller 380 in accordance with a variation of the second embodiment of the present disclosure is shown, in part, in FIG. 13. Fuel vapor controller 380 includes mount portion 382, nozzle seal 384, and pressure-relief valve 386. Fuel vapor controller 380 is made of an elastomeric material.

Bottom wall 362 is formed to include first opening 331 associated with nozzle seal 384 and second opening(s) 332 associated with pressure-relief valve 386. In this embodiment, pressure-relief valve 386 is self-centering owing to an illustrative cross-sectional V-shape and extends into second opening(s) 332 as shown, for example, in FIG. 13. The second opening 332 is defined by an interior border comprising spaced-apart first and second frustoconical edges 301 and 302 and mating with the V-shaped valve 386.

The invention claimed is:

1. A filler neck closure assembly for a vehicle fuel tank filler neck, the assembly comprising a housing adapted to be coupled to a fuel tank filler neck to receive a fuel-dispensing pump nozzle during fuel tank refueling, the housing including spaced-apart top and bottom walls and a side wall arranged to extend between the top and bottom walls to define an interior region of the housing therebetween, the top wall being formed to include an outer nozzle-receiving aperture opening into the interior region, the bottom wall being formed to include a passageway adapted to communicate with the fuel tank filler neck when the housing is coupled to the fuel tank filler neck, the housing further including a nozzle-actuated flapper door mounted for movement relative to the bottom wall to open and close the passageway formed in the bottom wall and located to position the bottom wall between the nozzle-actuated flapper door and the top wall, an insert located in the interior region to divide the interior region into an upper fluid distribution channel communicating with the outer nozzle-receiving aperture formed in the top wall and a lower fluid distribution channel communicating with the passageway formed in the bottom wall and the upper fluid distribution channel, a refueling vent manager located in the lower fluid distribution chamber and configured to provide means for receiving and sealingly engaging a fuel-dispensing pump nozzle extending through the outer nozzle-receiving aperture, the upper and lower fluid distribution channels of the interior region, and the passageway to move the nozzle-actuated flapper door relative to the bottom wall to open the passageway formed in the bottom wall and to allow liquid fuel to be dispensed therefrom into a fuel tank filler neck coupled to the housing and for establishing a normally closed fluid vent that opens to allow liquid fuel to flow from the fuel tank filler neck through, in sequence, the passageway, the lower and upper fluid distribution channels, and the outer nozzle-receiving aperture to form a stream of liquid fuel overflowing onto ground underlying the filler neck in response to failure of an automatic nozzle shut-off mechanism associated with the fuel-dispensing pump nozzle to stop discharge of liquid fuel from the fuel-dispensing pump nozzle at the end of a fuel tank refueling activity to provide a visual signal to an observer indicating failure of the automatic shut-off mechanism, and wherein the insert includes a nozzle-guide funnel having a wide-diameter upper portion located in confronting relation to the outer nozzle-receiving opening and formed to include an outlet aperture and a relatively narrower narrow-diameter lower portion located in confronting relation to the bottom wall and formed to include an inlet aperture, the nozzle-guide funnel is formed to include an overflow basin in an interior region of the wide-diameter upper and narrow-diameter lower portions and to cooperate with a surrounding portion of the side wall of the housing to locate an outer liquid transfer chamber therebetween to lie in fluid communication with the lower fluid distribution channel, and the nozzle-guide funnel is formed to include a side inlet aperture opening into the overflow basin and to the outer liquid transfer channel to conduct liquid fuel therebetween.

2. The assembly of claim 1, wherein the insert further includes an annular side wall coupled to the wide-diameter upper portion and arranged to lie in spaced-apart relation to an exterior surface of the nozzle-guide funnel to define the outer liquid transfer chamber therebetween.

3. The assembly of claim 2, wherein the annular side wall of the insert mates with the side wall of the housing to locate the insert in the upper fluid distribution channel formed in the housing.

4. The assembly of claim 1, wherein the refueling vent manager includes a partition arranged to mate with the nozzle-guide funnel to divide the interior region of the housing into the lower and upper fluid distribution channels, the partition is formed to include a central aperture opening into the overflow basin at the inlet aperture and into the lower fluid distribution channel and a vent aperture interconnecting the lower fluid distribution channel and the outer liquid transfer chamber in fluid communication, and the refueling vent manager further includes a fuel vapor controller coupled to the partition and configured to include a wall seal configured to provide the normally closed fluid vent and arranged to move relative to the partition between a normally closed position engaging the bottom wall to block flow of fluid from the passageway into the outer liquid transfer chamber through the vent aperture and an opened position disengaging the bottom wall to allow flow of fluid from the passageway into the outer liquid transfer chamber through the vent aperture.

5. The assembly of claim 4, wherein the insert further includes an annular side wall coupled to the wide-diameter upper portion and arranged to lie in spaced-apart relation to an exterior surface of the nozzle-guide funnel to define the outer liquid transfer chamber therebetween and the partition plate includes an outer peripheral edge trapped between a downwardly facing flange included in the annular side wall of the insert and an upwardly facing flange included in the housing.

6. The assembly of claim 4, wherein the fuel vapor controller includes a mount portion coupled to the partition plate, a radially inwardly extending nozzle seal arranged to extend inwardly from the mount portion into the inlet aperture to mate sealingly with a fuel-dispensing pump nozzle extending therethrough, and a radially outwardly extending wall seal configured to provide the normally closed fluid vent and arranged normally to engage the bottom wall of the housing to establish the normally closed position and movable relative to the mount portion to assume the opened position.

7. The assembly of claim 6, wherein the fuel vapor controller is a monolithic element made of an elastomeric material.

8. A filler neck closure assembly for a vehicle fuel tank filler neck, the assembly comprising a housing adapted to be coupled to a fuel tank filler neck to receive a fuel-dispensing pump nozzle during fuel tank refueling, the housing including spaced-apart top and bottom walls and a side wall arranged to extend between the top and bottom walls to define an interior region of the housing therebetween, the top wall being formed to include an outer nozzle-receiving aperture opening into the interior region, the bottom wall being formed to include a passageway adapted to communicate with the fuel tank filler neck when the housing is coupled to the fuel tank filler neck, the housing further including a nozzle-actuated flapper door mounted for movement relative to the bottom wall to open and close the passageway formed in the bottom wall and located to position the bottom wall between the nozzle-actuated flapper door and the top wall, an insert located in the interior region to divide the interior region into an upper fluid distribution channel communicating with the outer nozzle-receiving aperture formed in the top wall and a lower fluid distribution channel communicating with the passageway formed in the bottom wall and the upper fluid distribution channel, a refueling vent manager located in the lower fluid distribution chamber and configured to provide means for receiving and sealingly engaging a fuel-dispensing pump nozzle extending through the outer nozzle-receiving aperture, the upper and lower fluid distribution channels of the interior region, and the passageway to move the nozzle-actuated flapper door relative to the bottom wall to open the passageway formed in the bottom wall and to allow liquid fuel to be dispensed therefrom into a fuel tank filler neck coupled to the housing and for establishing a normally closed fluid vent that opens to allow liquid fuel to flow from the fuel tank filler neck through, in sequence, the passageway, the lower and upper fluid distribution channels, and the outer nozzle-receiving aperture to form a stream of liquid fuel overflowing onto ground underlying the filler neck in response to failure of an automatic nozzle shut-off mechanism associated with the fuel-dispensing pump nozzle to stop discharge of liquid fuel from the fuel-dispensing pump nozzle at the end of a fuel tank refueling activity to provide a visual signal to an observer indicating failure of the automatic shut-off mechanism, and wherein the refueling vent manager includes a partition coupled to the insert and located between the insert and the bottom wall and a fuel vapor controller coupled to the partition and formed to include an inner nozzle-receiving aperture in alignment with the central aperture formed in the bottom wall, the partition is formed to include a central aperture in alignment with the inner nozzle-receiving aperture of the fuel vapor controller and a vent aperture interconnecting the lower and upper fluid distribution channels in fluid communication, and the fuel vapor controller includes a wall seal configured to provide the normally closed fluid vent and mounted for movement between a normally closed position engaging the bottom wall to block flow of fluid from the passageway into the upper liquid distribution channel through the vent aperture and an opened position disengaging the bottom wall to allow flow of fluid from the passageway into the upper liquid distribution channel through the vent aperture.

9. The assembly of claim 8, wherein the partition is a plate formed to a series of small-diameter openings arranged in an arc to surround the central aperture formed in the partition, the central aperture is characterized by a diameter larger than the small-diameter openings, and wherein the wall seal is an elastic frustoconical member arranged to lie between the partition and the bottom wall.

10. The assembly of claim 1, wherein the bottom wall is formed to include a first opening sized to receive a fuel-dispensing pump nozzle and a second opening arranged to lie in spaced-apart relation to the first opening and cooperating with the first opening to define the passageway, the nozzle-actuated flapper door is configured to close both of the first and second openings upon movement of the nozzle-actuated flapper door to engage the bottom wall to block flow of fuel vapor and liquid from a fuel tank filler neck coupled to the housing into the lower fluid distribution channel, and the refueling vent manager includes a fuel vapor controller having a mount portion coupled to the bottom wall, a nozzle seal aligned with the first opening in the bottom wall and arranged to receive, contact, and mate with an exterior portion of a fuel-dispensing pump nozzle before the fuel-dispensing pump nozzle is moved to open the nozzle-actuated flapper door, and a wall seal arranged to extend outwardly from the mount portion normally to engage the bottom wall to close the second opening formed in the bottom wall.

11. The assembly of claim 10, wherein the mount portion has an annular shape, the nozzle seal has a frustoconical shape and is arranged to extend radially inwardly from the mount portion into the first opening, and the wall seal has a frustoconical shape and is arranged to extend radially outwardly from the mount portion and is made of an elastomeric material and is flexed normally to close the second opening.

12. The assembly of claim 10, wherein the mount portion has an annular shape, the nozzle seal has an annular shape and is arranged to extend radially inwardly from the mount portion into the first opening, and the wall seal extends normally into the second opening to engage an interior border formed in the bottom wall and configured to define the second opening.

13. The assembly of claim 12, wherein the interior border includes spaced-apart first and second frustoconical edges and the wall seal is V-shaped in cross-section to mate with the first and second frustoconical edges providing the interior border.

14. A filler neck closure assembly for a vehicle fuel tank filler neck, the assembly comprising a nozzle-receiving housing including a bottom wall formed to include a nozzle-receiving central aperture and a top wall formed to include an outer nozzle-receiving aperture and a refueling vent manager including a partition plate formed to include a central aperture and at least one vent aperture and a monolithic annular fuel vapor controller including an annular mount portion mounted in the central aperture formed in the partition plate, a radially inwardly extending nozzle seal arranged to extend radially inwardly from the annular mount portion to mate with a fuel-dispensing nozzle inserted into the nozzle-receiving housing, and a radially outwardly extending frustoconical annular wall seal arranged to extend radially outwardly from the annular mount portion normally to engage the bottom wall to block flow of fuel vapor and liquid fuel from a lower fluid distribution channel formed in the nozzle-receiving housing between the partition plate and the bottom wall and arranged to communicate with the nozzle-receiving central aperture in the bottom wall to an upper fluid distribution channel formed in the nozzle-receiving housing between the partition plate and the top wall and arranged to communicate with the outer nozzle-receiving aperture formed in the top wall, the radially outwardly extending frustoconical annular wall seal being movable from a normally closed position engaging the bottom wall to an opened position disengaging the bottom wall in response to admission of rising levels of liquid fuel in the lower fluid distribution channel owing to failure of a nozzle shut-off mechanism associated with the fuel-dispensing pump nozzle to shut off the fuel-dispensing pump nozzle at the end of a fuel tank refueling activity when the fuel tank is filled to a predetermined capacity.

15. The assembly of claim 14, further comprising an insert located in the upper fluid distribution channel and configured to include a nozzle-guide funnel arranged to divide the upper fluid distribution channel into an overflow basin provided inside the nozzle-guide funnel and an outer liquid transfer chamber provided outside the nozzle-guide funnel to receive liquid fuel discharged from the lower fluid distribution channel through the vent aperture formed in the partition plate, and wherein the nozzle-guide funnel is formed to include a side inlet aperture providing a passageway connecting the outer liquid transfer chamber to the overflow basin in fluid communication to allow liquid fuel extant in the outer liquid transfer chamber to flow through the side inlet aperture into the overflow basin during failure of an automatic nozzle shut-off mechanism associated with a fuel-dispensing pump inserted into the nozzle-receiving housing and then to overflow a weir established in the top wall along the outer nozzle-receiving aperture to provide a visual signal causing a person controlling the fuel-dispensing pump nozzle to shut the fuel-dispensing pump nozzle off manually.

16. The assembly of claim 15, wherein the partition plate is coupled to the insert.

17. The assembly of claim 15 wherein the nozzle-guide funnel includes a wide-diameter upper portion coupled to an upper portion of an annular side wall included in the nozzle-receiving housing and arranged to extend between the top and bottom walls and a relatively narrower narrow-diameter inner portion arranged to mate with the partition plate.

18. The assembly of claim 17, wherein the partition plate is trapped in a stationary position in the nozzle-receiving housing between an upwardly facing flange included in the nozzle-receiving housing and a downwardly facing edge on an annular side wall included in the insert and arranged to surround the nozzle-guide funnel to define the outer liquid transfer chamber therebetween.

* * * * *